United States Patent [19]
Willard

[11] Patent Number: 5,778,406
[45] Date of Patent: Jul. 7, 1998

[54] APPARATUS FOR DELIVERING CPU INDEPENDENT DATA FOR LITTLE AND BIG ENDIAN MACHINES

[75] Inventor: Pierre Mathias Willard, Redwood City, Calif.

[73] Assignee: Thomson Consumer Electronics, Inc., Indianapolis, Ind.

[21] Appl. No.: 497,492

[22] Filed: Jun. 30, 1995

[51] Int. Cl.⁶ ................................................. G06F 13/00
[52] U.S. Cl. ................................... 711/1; 348/7; 348/13
[58] Field of Search ........................ 364/514 R; 395/512, 395/200.18, 427, 460, 286, 200.13, 800, 412, 401; 370/300, 487; 386/98; 348/7, 13, 722; 711/1, 100, 173, 202

[56] References Cited

U.S. PATENT DOCUMENTS

| | | | |
|---|---|---|---|
| 5,389,963 | 2/1995 | Lepley et al. | 348/7 |
| 5,398,328 | 3/1995 | Weber et al. | 395/500 |
| 5,519,842 | 5/1996 | Atallah et al. | 395/412 |
| 5,537,157 | 7/1996 | Washino et al. | 348/722 |
| 5,550,987 | 8/1996 | Tanaka | 395/286 |
| 5,563,648 | 10/1996 | Menand et al. | 348/13 |
| 5,574,923 | 11/1996 | Heeb et al. | 395/800 |
| 5,581,706 | 12/1996 | Jessup, Jr. et al. | 395/200.13 |

FOREIGN PATENT DOCUMENTS

| | | | |
|---|---|---|---|
| 0729093 A1 | 8/1996 | European Pat. Off. | G06F 9/34 |
| 0729094 A1 | 8/1996 | European Pat. Off. | G06F 9/34 |
| 0751655 A2 | 1/1997 | European Pat. Off. | H04L 29/06 |
| 2229832 | 10/1990 | United Kingdom | G06F 7/00 |
| WO94/15269 | 7/1994 | WIPO | |
| WO96/35176 | 11/1996 | WIPO | G06F 13/40 |

Primary Examiner—Emanuel T. Voeltz
Assistant Examiner—Thomas Peeso
Attorney, Agent, or Firm—Joseph S. Tripoli; Eric P. Herrmann; Ronald H. Kurdyla

[57] ABSTRACT

A distributed computer system is disclosed which includes a central location and a plurality of remote locations. A central location computer system generates a module which includes a data section containing a plurality of data units. Each of the data units is either a minimum addressable data unit or a longer data unit. Each longer data unit contains a plurality of minimum addressable data units. The module also includes a swap section containing data identifying locations of longer data units within the data section. A remote location computer system receives a module, and contains a loader. The loader swaps the minimum addressable data units of the longer data units in the data section. A transmission link, transmits the module from the central location computer system to the remote location computer system.

17 Claims, 4 Drawing Sheets

APPARATUS FOR DELIVERING CPU INDEPENDENT DATA FOR LITTLE AND BIG ENDIAN MACHINES

The present invention relates to multimedia apparatus such as an interactive television transmission system, for delivering data having a common format to central processing units (CPUs) operating in either little endian or big endian manner.

Almost all computer systems today include a memory system that provides separately addressable locations for bytes (8-bit units) of data, meaning the byte is the minimum addressable unit of data. Longer data units, which may be referred to as words (16 bits) and/or long words (32 bits), are accessed, processed and stored by CPUs as sequences of bytes in adjacent memory locations. CPUs employ one of two methods for accessing and storing such longer data units in memory. A first method is to store a longer data unit from its least significant byte to its most significant byte in increasing memory addresses. A CPU using this method for accessing and storing longer data units operates in a manner generally termed little endian. A second method is to store a longer data unit from its most significant byte to least significant byte in increasing memory addresses. A CPU using this method for accessing and storing longer data units operates in a manner generally termed big endian.

TABLE I

| Address | Little Endian | Big Endian |
| --- | --- | --- |
| 0x1000 | 0x78 | 0x12 |
| 0x1001 | 0x56 | 0x34 |
| 0x1002 | 0x34 | 0x56 |
| 0x1003 | 0x12 | 0x78 |

TABLE I illustrates an example of the storage of the long word (32 bit) variable 0x12345678 at location 0x1000 in memory in both the little endian and big endian arrangement. The system illustrated in TABLE I, includes a memory addressable at a byte level. That is, the byte is the minimum addressable data unit, or, put another way, each byte is stored in a separately addressable location. The long word variable 0x12345678 is stored in sequential memory locations starting at location 0x1000. In a little endian system, the least significant byte (i.e. 0x78) is stored in the lowest memory location (i.e. 0x1000), with successively more significant bytes stored in succeeding memory locations. In a big endian system, the most significant byte (i.e. 0x12) is stored in the lowest memory location (i.e. 0x1000), with successively less significant bytes stored in succeeding memory locations.

It is important for the proper execution of a program that the data be stored in memory in the proper arrangement for the CPU executing the program. In current systems this is not a problem because every CPU includes program development tools for translating source programs (e.g. assembly language or higher level language) into the native machine code for that CPU, including placing constant or initial variable data into memory in the proper format. If the CPU is a little endian CPU, then these tools emit data in the little endian format appropriate for that CPU. Similarly, if the CPU is a big endian CPU, then these tools emit data in the big endian format appropriate for that CPU.

Recently, however, distributed systems such as multimedia (interactive) systems have been proposed in which computer programs are transmitted from a central location to remote locations. The remote CPU, and in particular the endian format used by the remote CPU for longer data units, is not known to the central location. In fact, CPUs using both endian formats are expected to be able to receive and execute the transmitted computer program. Specifically, interactive television systems have been proposed in which video, audio and computer program components will be broadcast from a central location, through a satellite link, to individual subscriber locations. Each subscriber location will include a television receiver for displaying the received video and audio information, and a CPU for executing the received computer program information. Different subscriber locations may have different CPUs using different endian formats.

It is envisioned that the code portion of the computer programs will be intermediate code which will be interpreted by an interpreter implemented on the CPU in the subscriber location. However, the CPU in each subscriber location will be expected to have available to it certain pre-coded routines for performing common tasks. These routines will be implemented in the native code of the CPU at the subscriber location to maximize the speed of execution. Any data accessed by these native code routines must be stored in the endian format of that CPU.

One solution might be to transmit two versions of the computer program from the central location: one for big endian CPUs and a second one for little endian CPUs. This solution, however requires that all computer program data be transmitted twice over the satellite link, once in big endian format and a second time in little endian format. This is wasteful of bandwidth. It is desirable to transmit data only once over the satellite link, but make that data of use to CPUs using both the big endian and little endian format.

In accordance with principles of the present invention, a distributed computer system includes a central location and a plurality of remote locations. A central location computer system generates a computer program consisting of one or more modules, each of which includes a data section containing a plurality of data units. Each of the data units is either a minimum addressable data unit or a longer data unit. Each longer data unit contains a plurality of minimum addressable data units. The module also includes a swap section containing data identifying locations of longer data units within the data section. A remote location computer system receives a module, and contains a loader. The loader swaps the minimum addressable data units of the longer data units in the data section. A transmission link transmits the module from the central location computer system to the remote location computer system.

Figure 1:
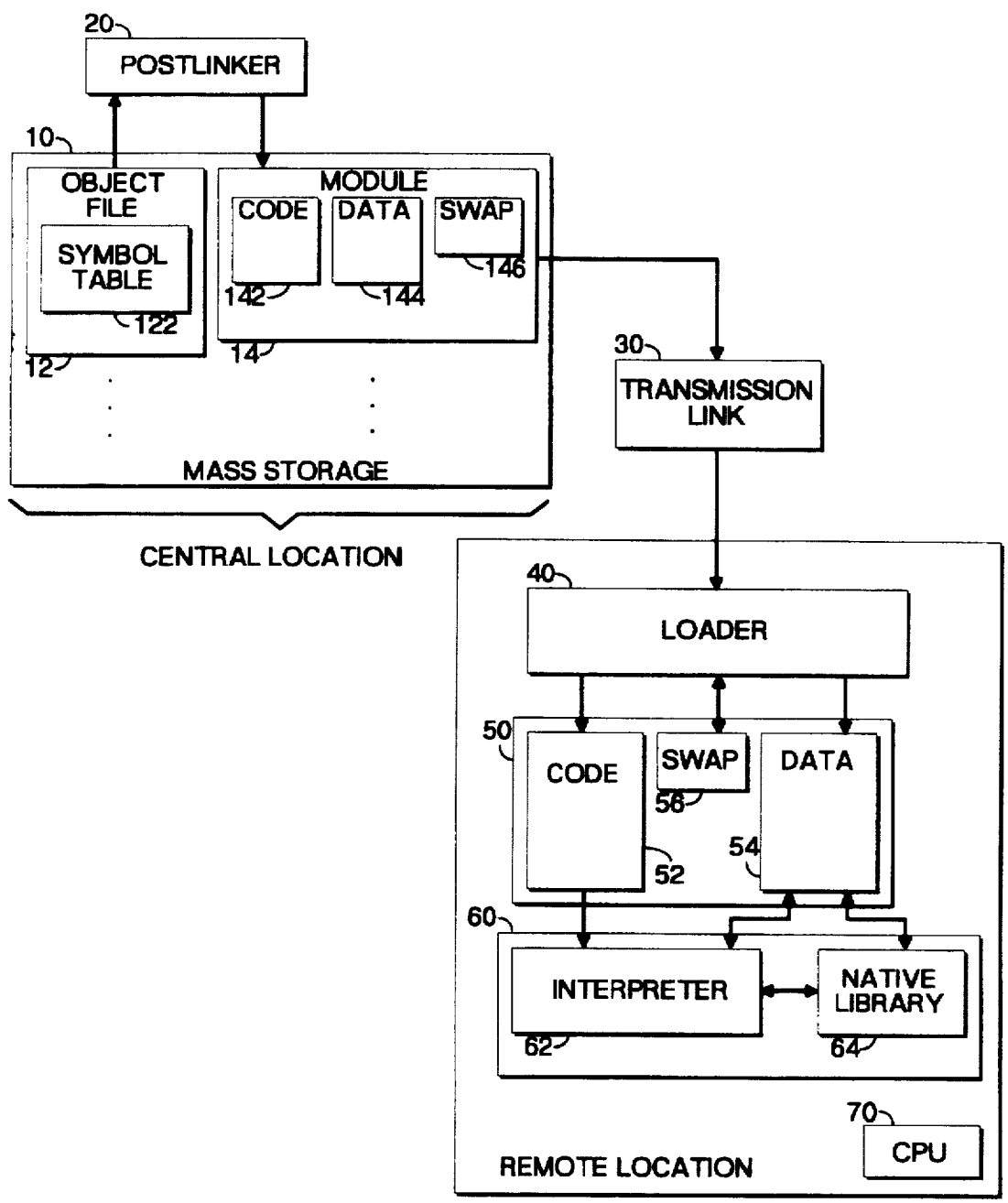
FIG. 1 is a block diagram of a distributed computer system employing the present invention.

FIG. 1 is a block diagram of a distributed computer system employing the present invention. In FIG. 1, a central location includes a computer system for preparing computer program code and data for transmission to remote locations. The computer system includes a central processing unit (CPU), read/write memory (RAM), read only memory (ROM), and input and output devices such as CRT terminals and printers, coupled together in a known manner via a system bus, none of which are shown. The computer system further includes a mass storage device 10, also operating in a known manner and coupled to the system bus in a known manner.

In operation, the computer system is used by a programmer to generate computer programs to be distributed from the central location to a plurality of remote locations. As is usual in program development, the application programmer uses the computer system in a known manner to generate a source document (not shown), which may consist of one or more source and/or control files (not shown). The source document is processed in a known manner by various programs (e.g. compilers), executed on the computer system, each of which can produce intermediate results, to generate final modules, ready to be distributed to the remote locations. The mass storage device 10 holds data representing the intermediate results of the program development process, e.g. one or more object files such as an object file 12; and one or more final modules of the program development process such as a module 14. In FIG. 1, a postlinker routine 20 takes as input the object module 12 and generates as output the module 14, in a manner to be described in more detail below.

In an interactive television system, for example, application programs for influencing the interaction of viewers with broadcast television signals are developed by application programmers using program development tools in the central location. One of the intermediate results of the program development tools is the object file 12. The object file 12 includes data representing executable code (not shown), and a symbol table 122. The symbol table 122 contains data relating each variable name, its data type, and the address in memory in which that variable will be stored when the program is executed. The symbol table 122 further contains information relating each data type in the symbol table 122 to basic data types, such as byte, word and long word, as described above.

The postlinker 20 processes, in a known manner, the data in the object file 12 representing the executable code (not shown) and generates intermediate code of a known structure in an intermediate code section 142 of the module 14. The postlinker 20 further analyses in a known manner the information in the symbol table 122 of the object module 12, and generates a data section 144 including data representing an image of the data in the symbol table 122 as it would be stored in a memory when the program code contained in the code section 142 the module 14 is executed at the remote location.

The module 14 (and all other modules, not shown) are transmitted to the plurality of remote locations via the transmission link 30. Transmission link 30 consists of known elements such as output adapters coupled to the system bus of the central location computer system, schedulers, packetizers, multiplexers, RF satellite uplinks, satellite transponders, RF satellite downlinks, demultiplexers, and input adapters coupled to a system bus of a computer system at the remote location (none of which are shown). The transmission link operates in a known manner to transfer the module 14 from the central location to the remote location as required.

In an interactive television system, the central location also contains a source of television video and audio signals meant to accompany the computer program represented by the module 14 (and all other modules, not shown). The television video and audio signals are packetized and multiplexed together along with the module 14 to form a composite interactive television signal. This composite signal is broadcast to all of the remote locations e.g. via a satellite link in a known manner. The remote locations have receivers including detectors for detecting/providing this composite signal, and e.g. inverse transport processors for demultiplexing the module(s) from the television video and audio signals. The television video and audio signals are processed in a known manner and presented to systems which may utilize these signals. For example, the television video and audio signals may be supplied to a television receiver or a VCR at a subscriber location. In addition, it is further possible for the remote location computer system to execute the computer program represented by the module(s), and, as a result of the program execution, generate image video signals and sound audio signals. These computer generated video and audio signals may be combined with the television video and audio signals, respectively, to generate a combined television/computer multimedia presentation. Further, it is possible for a user to interact with the executing computer program (e.g. by use of a remote control unit) to interact with the displayed multimedia presentation. One skilled in the art of interactive television system design will understand how all of the above may be performed.

As described above, each remote location has a computer system including a CPU 70, a RAM 50, a ROM 60, and various input and output devices (not shown), all coupled together in a known manner via a system bus (not shown), and operating in a known manner. One input device (not shown) couples the output of the transmission link 30 to the system bus. A loader processing routine 40, executing on the CPU, controls the operation of this input device. When a desired module is received from the transmission link 30, the loader 40 transfers the code section 52 and the data section 54 into the RAM 50.

When the received module has been completely transferred into the RAM 50, an interpreter routine 62, permanently stored in the ROM 60, accesses the intermediate code (described above) in the code section 52, and executes it by interpreting it in a known manner. Some instructions in the code section 52 will refer to data stored in the data section 54. When executing these instructions, the interpreter 62 accesses the desired data in the data section 54 and executes the program.

It is well known that interpreters are a very slow means for executing programs. While speed is not always important, there are functions for which it is desirable. To perform such functions, the computer system in the remote location includes a library 64 of routines coded in the native code of the CPU in the remote location.

However, as is described above, respective CPUs at different remote locations may operate according to different endian formats. That is, some remote CPUs may operate according to the big endian format, while others may operate according to the little endian format. If the data section is generated and transported in one of the endian formats, for example in the big endian format, the native libraries 64 for remote CPUs operating according to the big endian format may access longer data units stored in the data section 54 directly using the most efficient multi-byte read and write native instructions available. But the native libraries 64 of remote CPUs operating according to the little endian format must access longer data units one byte at a time, and rearrange the bytes by swapping them from the big endian format to the little endian format before the data itself may be processed. This adds substantial overhead to these routines, which must run as quickly as possible.

According to principles of the present invention, the module 14, generated in the central location, further includes a swap section 146. The swap section 146 includes data indicating where within the data section 144 longer data units are stored. The postlinker 20, while analyzing the symbol table 122 in the object file 12 can determine where in the data section these longer data units are stored. The postlinker 20, when it identifies a longer data unit, makes an entry in a table to indicate the relative location within the data section 144 at which the longer data unit resides. When the object file 12 has been completely analyzed, data representing this table is stored in the swap section 146 of the module 14, and is transmitted over the transmission link 30 to the remote locations along with the intermediate code section 142 and the data section 144.

In the illustrated embodiment, data is stored in the data section 144 in the big endian format exclusively. The swap section 146 contains data indicating where within the data section 144 longer data units are stored. In the remote location, the loader 40 stores the code section 52, the data section 54 and the swap section 56 of the received module in the RAM 50. If the CPU in the remote location operates according to the big endian format, then the RAM 50 locations containing the swap section 56 are not needed, and they may be released to be used for other purposes. The loader 40 may then report completion of its function, and the interpreter 62 and native library 64 may each access the data in the big endian format used by the remote CPU.

If, on the other hand, the CPU in the remote location operates according to the little endian format, then the loader 40, before completing its process, analyzes the data in the swap section 56. At every location within the data section 54 which the swap section 56 indicates contains a longer data unit, the loader 40 swaps the bytes of that data unit, thus converting that data unit to the little endian format from the big endian format. After all of the longer data units have all been converted to the little endian format, the RAM 50 locations containing the swap section 56 are no longer needed and they may be released to be used for other purposes. Then the loader 40 may report completion of its function, allowing the interpreter 62 and native library 64 to begin its execution. Because all of the data in this remote location is now in the little endian format, the routines in the native library 64 may operate using the most efficient multi-byte read and write native instruction available.

An interactive television system according to the present invention allows CPUs in remote locations operating in both the big endian and little endian formats to access transmitted data in their native modes, without requiring the transmission of the data twice from the central location, once in big endian format and a second time is little endian format. All that is required is the generation of a small swap section in each module by a postlinker routine in the central location; and an additional step in the loader routine of remote locations containing CPUs operating in the endian format different from that of the transmitted data, to swap the longer data units before completion of the loading.

Figure 2:
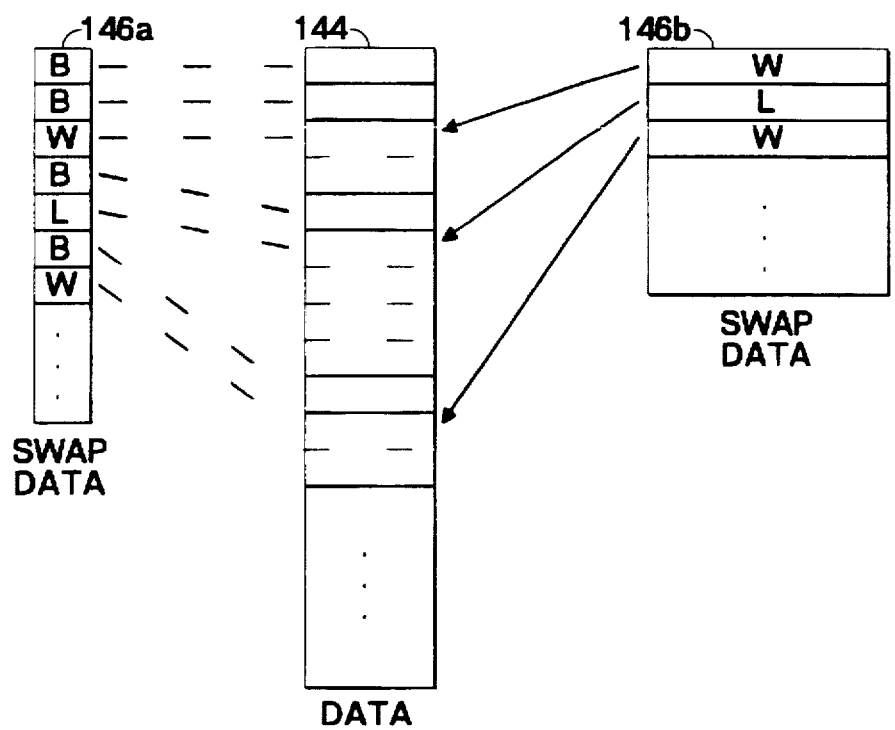
FIG. 2 is a memory layout diagram illustrating the arrangement of a data section, and alternative corresponding swap data sections.

FIG. 2 is a memory layout diagram illustrating the arrangement of a data section 144, and alternative corresponding swap data sections 146a and 146b. In FIG. 2 the data section 144 is illustrated as a column in the middle of the figure. Each variable is illustrated as a rectangle within this column with the size of the rectangle corresponding to the size of the variable. Specifically, each of the top two variables is a byte variable; the third variable is a word variable, illustrated as consisting of two consecutive bytes; the fourth variable is a byte variable; the fifth variable is a long word variable, illustrated as consisting of four consecutive bytes; the sixth variable is a byte variable; and the seventh variable is a word variable, illustrated as consisting of two consecutive bytes. There may, of course, be other variables in the data section 144, which may be byte variables, word variables or long word variables.

The column on the left hand side of the figure illustrates a first implementation of a swap data section 146a. In this implementation, there is an entry for each variable in the data section 144, in the order they appear in the data section, each entry indicating the size of the corresponding variable. In the swap section 146a, there are seven entries corresponding to the seven variables illustrated in the data section 144. The contents of each entry is illustrated by a letter to indicate the type of the corresponding variable. Specifically, the first two entries contain the indication "B" to indicate that the first two variables are byte variables. The next entry contains the indication "W" to indicate that the third variable is a word variable. The next entry contains the indication "B" to indicate that the fourth variable is a byte variable. The next entry contains the indication "L" to indicate that the fifth variable is a long word variable, and so forth. As can be seen, in this implementation, there are three possible lengths for a variable (B, W or L), so the length may be represented by two bits, and four such indications can be packed within a single byte.

Alternatively, only the location of the longer data units within the data section may be contained in the swap section. This is illustrated in the swap section 146b illustrated on the right hand side of FIG. 2. In the illustrated portion of the data section 144, there are three longer data units in the data section 144 which would need to be swapped from one endian format to the other. Each entry in the swap section illustrated in 146b contains an offset value which points to the location within the data section 144 of a longer data unit, and a type of that unit. Specifically, the first entry in the swap section 146b contains a pointer to the location of the third variable, and an indication that it is a word variable (two bytes). The next entry points to the fifth variable in the data section 144, and contains an indication that that variable is a long word variable (four bytes). The next entry points to the seventh variable, and contains an indication that that variable is a word variable (two bytes). Each entry in a swap section according to this implementation must be large enough to contain the offset pointer to the location within the data section, and the indication of the type in that location. But there are entries only for the longer data units, not every data unit. Alternatively, there may be separate lists for each type of variable; i.e. one list for the word variables and a separate list for long word variables. Each entry in each such list need only contain the offset pointer to the location of the variable in the data section 144.

In either such implementation, the postlinker 20 (of FIG. 1) analyzes the symbol table, and generates the swap section 146 to identify the locations in the data section 144 of the longer data units, as described above. The loader 40 first loads the swap section 56 then, if necessary to change the endian format of the longer data units in the data section 54, traverses the data in the swap section 56, identifies the locations in the data section 54 of the longer data units, and swaps the bytes of those locations. For a swap section as illustrated in 146a, the entire data section 144 is scanned, and if the entry in the swap section 146a indicates that the location contains a longer data unit (a word or long word variable) those bytes are swapped. For the swap section as illustrated in 146b, each entry in the swap section is processed by swapping the bytes at the indicated location in the data section 144.

In modern programming languages, variables are often complex variables formed from the basic byte, word, and long word variables, described above, and arranged in structures, arrays, arrays of structures, and/or structures containing arrays. Such arrangements of data result in repetitions of data of the same type, or repetitions of patterns of types of data. The size of the swap section may be reduced by special coding to permit efficient representation of repeated variable types, or patterns of variables.

Figure 3:
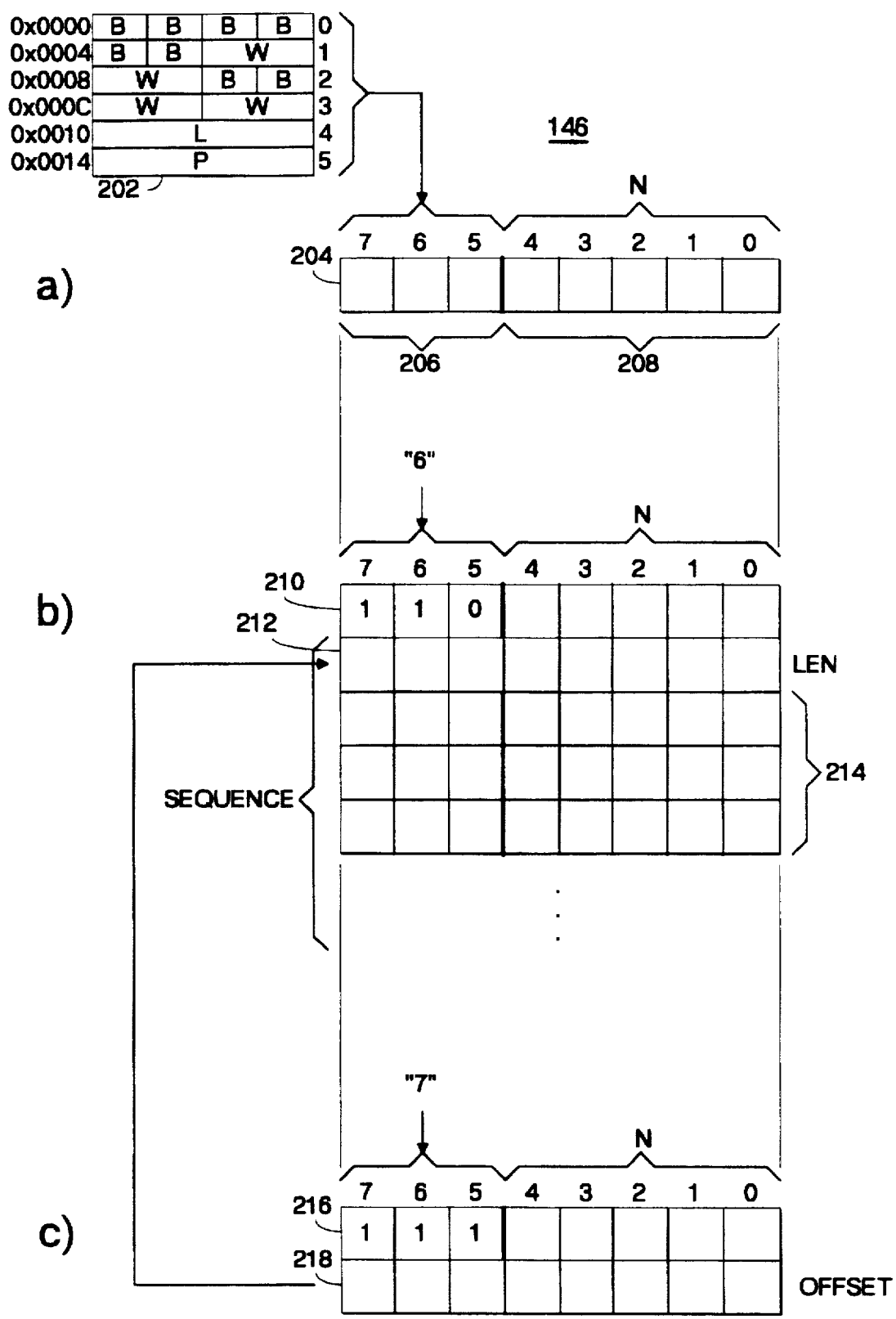
FIG. 3 is a memory layout diagram illustrating the coding of a swap section according to an embodiment of the present invention.

FIG. 3 is a memory layout diagram illustrating the coding of respective portions of a swap section 146 according to the present invention. The arrangement of the swap section 146 illustrated in FIG. 3 corresponds to the swap section 146a (of FIG. 2) in which there is an entry in the swap section for each byte in the data section. Additional compression is achieved in a swap section 146 as illustrated in FIG. 3 by taking advantage of repetition of data of the same type and repetitions of patterns of types of data.

In FIG. 3, the remote locations contain CPUs which have three basic variable types: byte, word and long word; and which require that the longer data units (word and long word) be aligned. That means that byte variables may be stored at any location within the memory, word variables may only be stored at byte locations having even addresses, and long word variables may only be stored at byte locations having addresses divisible by four. Such arrangements are well known, and will be understood by those skilled in the art of computer system design.

Special long words, called pointers, are separately designated "P" in FIG. 3. Pointers are well known programming constructs, and are treated specially during the loading process. They are the same size as long words, i.e. four bytes, they must be stored only at byte locations having addresses divisible by four, and they must have their bytes swapped if it is necessary to change endian format. In addition, their value must be changed to reflect the absolute location in the RAM of the remote location into which the data section is stored, a process known as relocation. The relocation process is well known, and will not be described in more detail here.

The arrangement of data in the data section is represented in the swap section 146 as a series of bytes coded in the manner described below. The scheme for coding a swap section 146 illustrated in FIG. 3 first considers the data section (not shown) as being divided into aligned long words. FIG. 3 includes a table 202 in the upper left indicating the only permissible arrangements of byte variables (designated "B"), aligned word variables (designated "W") and aligned long word variables (designated "L" for long words or "P"for pointers) within an aligned long word in memory. Addresses on the left hand side of the table 202 are illustrative of long word aligned (divisible by four) addresses in the data section, and are not meant to indicate actual address in a data section.

As can be seen, there are six permissible arrangements of variables within an aligned long word. The top entry, numbered "0" on the right hand side, illustrates that an aligned long word may contain four separate byte variables (B). The second entry, numbered "1", illustrates that an aligned long word may contain two byte (B) variables followed by a word variable (W). The third entry, numbered "2", illustrates that an aligned long word may contain a word variable (W) followed by two byte variables (B). The fourth entry, numbered "3", illustrates that an aligned long word may contain two word variables (W). The fifth entry, numbered "4", illustrates that an aligned long word may contain a long word variable (L); and the sixth entry, numbered "5", illustrates that an aligned long word may contain a pointer (P). No other arrangements are permissible.

Referring to FIG. 3a, an aligned long word in the data section may be represented by an entry in the swap section 146. The number on the right hand side of the entry in table 202, representing the pattern of variables within such an aligned long word, is binary coded into three bits in a known manner. These three bits are inserted into the three most significant bits (bits 7:6:5) 206 of the entry 204 in the swap section 146 corresponding to that aligned long word. A measure of compression is achieved in the swap section by allowing each entry 204 in the swap section to represent a number of consecutive aligned long words in memory, each containing the same pattern of variables. The remaining bits (bits 4:3:2:1:0) 208 contain a binary coded numerical value N representing a number of repetitions of the pattern represented by the three most significant bits. The numerical value N can have a value from 0 to 31. This numerical value N represents the number of repetitions of the pattern −1. A numerical value N of "0" represents a repetition value of 1, i.e. a single occurrence of the pattern 206 in the data section. A numerical value N of "1" represents a repetition value of 2, and a numerical value N of "31" represents a repetition value of 32. Thus, the number of repetitions of the pattern represented by the binary coded value 206 which may be represented by a single byte entry 204 in the swap section 146 may run from 1 to 32.

As described above, variables in a program may be complex combinations of the basic data types, including structures, arrays, arrays of structures and/or structures containing arrays. These complex combinations are constructed of sequences of basic data types arranged in a specified manner. The binary values not used for coding patterns from table 202, i.e. "6" and "7", are used for coding sequences of basic data types, and repeats of previously defined patterns, respectively, such as may result from repeated instances of such structures and arrays. FIG. 3b illustrates the coding of a portion of the swap section 146 representing a repetitive sequence of patterns from table 202. When such a sequence is identified (e.g. from the symbol table 122 by the postlinker 20 of FIG. 1), a binary coded value of "6" is placed in the most significant three bits (7:6:5) of a first byte 210 in the swap section 146 to indicate that this entry in the swap section 146 represents a sequence, and not a pattern of basic data types, as in FIG. 3a. As in FIG. 3a, the five least significant bits in the first byte 210 is a binary coded value N representing the number of repetitions of the specified sequence. In this case, the binary coded numerical value N represents the number or repetitions −2 of the sequence. Thus, the number of repetitions of the identified sequence may run from 2 to 33.

The next byte 212 in the swap section contains the length −1 of the sequence in the swap section 146 and is determined in a manner to be described below. Following the sequence length byte 212 is a series of bytes 214, coded as described above with respect to FIG. 3a. The number of bytes in the series 214 is determined and a number N equal to the number of bytes −1 in the series is binary coded and inserted into the sequence length byte 212, as described above.

When a complex structure is defined, e.g. in the symbol table 122 (of FIG. 1) the arrangement of basic data types necessary to represent that structure may be determined by the postlinker 20. Whenever an instance of such a data structure is defined in the symbol table 122, an entry as illustrated in FIG. 3b is made in the swap section 146. An array of such structures may be represented by a number of repetitions of that data structure, specified by a binary coded number N representing the number of repetitions −2, as described above.

If, another instance of that data type is defined later in the symbol table 122 (of FIG. 1), then instead of reinserting the sequence entry previously inserted as in FIG. 3b, a separate entry, termed a back pointer entry, is inserted into the swap section 146 referring back to the previous sequence entry. FIG. 3c illustrates the coding of a back pointer entry. In a back pointer entry, a binary value "7" is coded into the most significant three bits of the first byte 216. As in FIG. 3a and FIG. 3b, the five least significant bits of the first byte 216 contain a binary coded number N representing the number of repetitions of the previously defined sequence represented by the back pointer entry. In FIG. 3c, the number N is the number of repetitions −2, and represents a number of repetitions from 2 to 33.

The next byte 218 represents an offset in the swap section 146 back to the previously inserted sequence entry, as described in FIG. 3b. The offset represents the number of bytes between the current back pointer entry, and the previously defined sequence entry. This offset points to the sequence length byte 212 in the previously defined sequence entry, as illustrated by the arrow from the back pointer offset byte 218 in FIG. 3c to the sequence length byte 212 in FIG. 3b. Using the coding scheme illustrated in FIG. 3, the locations of the basic data types: bytes, words and long words within the data section; may be easily determined by the loader 40 (of FIG. 1) by traversing the entries in the swap section 146. Longer data units: words, long words and pointers, may be found and byte-swapped, if it is necessary to change the endian format of those data units.

Figure 4:
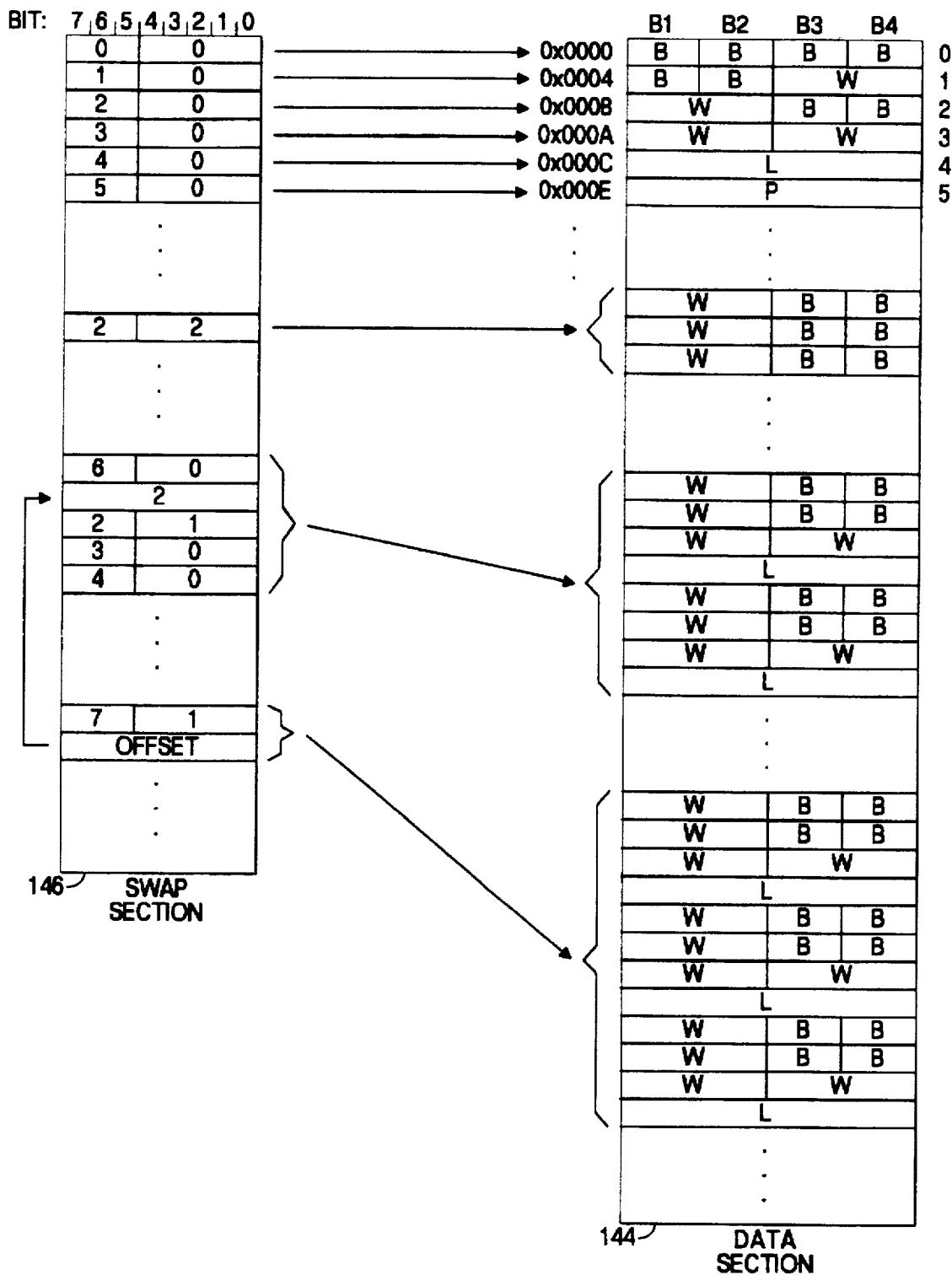
FIG. 4 is a memory layout diagram illustrating an example of a data section and corresponding swap section coded according to FIG. 3.

FIG. 4 is a memory layout diagram illustrating an example of a data section 144 and corresponding swap section 146 coded according to FIG. 3. In FIG. 4, portions of the data section 144 are illustrated on the right hand side of the figure, and corresponding sections of the swap section 146 are illustrated on the left hand side of the figure. Bytes forming the entries in the swap table are illustrated as horizontal rectangles. Some of the bytes are logically divided into portions, indicated by vertical lines within the rectangles. The bits comprising each portion are illustrated above the swap section 146. Each horizontal rectangle in the data section 144 corresponds to an aligned long word in memory which contains four bytes. These bytes, B1, B2, B3, and B4 are illustrated above the data section 144. The addresses on the left of each of the first six aligned long words are meant to illustrate only that the long words are aligned, and not to indicate an absolute location in the data section. The arrangement of basic variable types within each illustrated aligned long word is indicated by a "B"0 for a byte variable; a "W" for a word variable, consisting of two adjoining bytes; a "L" for a long word variable, consisting of four adjoining bytes; and a "P" for a pointer, also consisting of four adjoining bytes.

The first six aligned long words in the data section 144 of FIG. 4 contain variables in the same patterns of basic data types as are illustrated in the table 202 in FIG. 3a. The designations "0" through "5" on the right of the first six long words are the number of the pattern in the corresponding long word, also as illustrated in the table 202.

The first entry in the swap section 146 corresponds to the first aligned long word in the data section 144. That aligned long word is at address 0×0000, and contains four byte variables "B". The binary coded representation for this pattern is "0", which is coded into the three most significant bits, 7:6:5. There is only one such consecutive pattern, so the number of repetitions is 1. The number N, coded into the five least significant bits, 4:3:2:1:0, is the number of repetitions (1) −1, or 0. The next five entries in the swap section 146 correspond to the next five aligned long words in the data section 144 and are similarly coded.

The next illustrated entry in the swap section 146 corresponds to a pattern in the data section 144 which is repeated three times. In this case, the repeated pattern is a word variable W followed by two consecutive byte variables B. This pattern is represented by a binary coded value "2", as illustrated in table 202 of FIG. 3. The binary coded value "2" is stored in the three most significant bits 7:6:5. The number of repetitions, in this case is three. The number N, coded into the five least significant bits, 4:3:2:1:0, is the number of repetitions (3) −1, or 2.

The next illustrated entry in the swap section 146 consists of five consecutive bytes and represents a repeated sequence of patterns. This sequence consist of two consecutive aligned long words containing the same pattern: a word variable W followed by two consecutive byte variables B. This is followed by an aligned long word containing the pattern of two consecutive word variables W; and this is followed by an aligned long word containing the pattern of a long word variable L. This sequence is repeated twice. In the corresponding entry in the swap section 146, the first byte contains a binary value "6" in its three most significant bits 7:6:5, as in FIG. 3b. The five least significant bits are coded with a number N, equal to the number of repetitions of the sequence −2, as illustrated in FIG. 3b. In this case, the number N is the number of repetitions (2) −2, or 0. The next byte contains the binary coded number of entries representing the length of the sequence −1. In this case, there are three following entries describing the sequence (as will be described below), so the value stored in the sequence length byte is the number of entries (3) −1, or 2.

The three following bytes describe the sequence itself, coded as illustrated in FIG. 3a. The sequence illustrated in the corresponding section of the data section 144 starts with two consecutive aligned long words, each containing the pattern of a word variable W followed by two byte variables B. This is two repetitions of the pattern numbered 2. Thus, the first byte describing the sequence in the swap section 146 has a 2 in the three most significant bits 7:6:5, and a 1 (number of repetitions (2) −1) in the five least significant bits 4:3:2:1:0. The next aligned long word in the sequence in the data section 144 contains the pattern of two consecutive word variables W. This is one repetition of the pattern numbered 3. The byte describing this pattern in the swap section 146 has a 3 in the three most significant bits 7:6:5, and a 0 in the five least significant bits 4:3:2:1:0. The final aligned long word in the sequence in the data section 144 contains the pattern of a single long word variable L. This is one repetition of the pattern numbered 4. The byte describing this pattern in the swap section 146 has a 4 in the three most significant bits 7:6:5, and a 0 in the five least significant bits 4:3:2:1:0.

The next illustrated entry in the swap section 146 consists of two bytes, and represents three repetitions of the sequence just described in the data section 144. This entry in the swap section 146 begins with a byte containing a "7" in the three most significant bits 7:6:5. The five least significant bits 4:3:2:1:0 contain the number of repetitions (3) −2, or 1. The next byte contains an offset representing a back pointer to the sequence length byte of the entry in the swap section 146 in which the sequence was originally described, illustrated by an arrow to the sequence length byte (containing 2) in the previously illustrated entry in the swap section 146.

In this manner, the type of variable contained in every byte in the data section 144 is represented by a corresponding entry in the swap section 146. The swap section 146 may be generated by the postlinker 20 (of FIG. 1), as described above, by analyzing the symbol table 122 and generating entries in the swap section 146 representing the basic variable data types making up the variables referred to in the symbol table 122. The received swap section 56 may be analyzed by the loader 40 and the longer data units in the received data section 54 located and byte-swapped, if necessary, to convert them to the proper endian format.

What is claimed is:

1. A multimedia transmission system including a distributed computer system, comprising:

a central location computer for generating signal representing a module including;

a data section, comprising a plurality of data units, each data unit being one of a minimum addressable data unit and a longer data unit, each longer data unit comprising a plurality of minimum addressable data units; and a swap section, comprising data identifying locations of respective longer data units within the data section;

a remote location computer system, responsive to the module representative signal, and containing a loader for extracting the module and swapping the minimum addressable data units of longer data units in the data section at locations identified by the data in the swap section; and a transmission link, for transmitting the module representative signal from the central location computer system to the remote location computer system.

2. The multimedia transmission system of claim 1 wherein:

the plurality of minimum addressable data units in a longer data unit are arranged in a predetermined order in the data section; and the loader swaps the minimum addressable data units of longer data units by reversing the order of the minimum addressable data units.

3. The multimedia transmission system of claim 1 wherein the transmission link comprises:

a transmitter in the central location computer system;

a receiver in the remote location computer system; and a satellite link, coupled between the transmitter and receiver.

4. The multimedia transmission system of claim 1 wherein:

the central location further comprises a source of television video and audio signals and the transmitter further comprises a multiplexer for combining the module representative signal with the television video and audio signals to form an audio/video/interactive (AVI) composite signal; and the remote location further comprises a demultiplexer for separating the television video and audio signals and the module from the received composite AVI signal, and utilization means for the television video and audio signals.

5. A receiver including a remote location computer system, comprising:

a source of a signal module including:

a data section, comprising a plurality of data units, each data unit being one of a minimum addressable data unit and a longer data unit, each longer data unit comprising a plurality of minimum addressable data units; and a swap section, comprising data identifying locations of longer data units within the data section, wherein the swap section comprises a plurality of entries, each entry including a portion containing data identifying a pattern of data units within a corresponding aligned long word in the data section; and a loader program resident in a remote location computer for conditioning said remote location computer to swap the minimum addressable data units of longer data units in the data section at locations identified by the data in the swap section, wherein a pattern of data units within an aligned long word comprises one of:

four consecutive byte variables;

a long word variable; and a combination of byte variables and a word variable.

6. The receiver set forth in claim 5 wherein the signal module source comprises a detector coupled to a transmission link, for detecting a signal including the signal module.

7. The receiver set forth in claim 5 wherein:

the received signal further includes multiplexed television video and audio signals; and the system further comprises a demultiplexer for separating signal modules from the television video and audio signals and a utilization means for the received television video and audio signals.

8. The receiver set forth in claim 5 wherein:

a minimum addressable data unit is a byte variable;

a longer data unit is one of a word variable consisting of two bytes, and a long word variable consisting of four bytes;

data units are stored in the data section in an aligned manner in consecutive aligned long words.

9. The receiver set forth in claim 8 wherein the swap section further comprises a plurality of entries identifying data units in a sequence of aligned long words in the data section.

10. The receiver set forth in claim 9 wherein each sequence repetition representative entry comprises an entry containing data representing a back pointer offset to the previous sequence representative entry, and said loader is responsive to said back pointers for swapping the minimum addressable data units of longer data units in the data section at locations identified by the respective sequence.

11. In a multimedia transmission system, a central location computer system, comprising:

a source of computer program data comprising a symbol table in an object file;

a postlinker, coupled to the computer program data source, for scanning said program data and generating a data module comprising:

a data section, comprising a plurality of data units, each data unit being one of a minimum addressable data unit and a longer data unit, each longer data unit comprising a plurality of minimum addressable data units; and responsive to the format of data in the data section, generating a swap section, comprising data identifying locations of longer data units within the data section.

12. The multimedia transmission system set forth in claim 11 further comprising a transmitter, coupled to a transmission link, for broadcasting the data module.

13. The multimedia transmission system set forth in claim 12 further comprising:

a source of television video and audio signals; and a multiplexer, coupled to the television signal source, and responsive to the module, for generating a composite signal including the data module and the television video and audio signals.

14. In a multimedia transmission system including a central computer system, a remote computer system and a transmission link coupled between the central computer system and the remote computer system, a method for operating the central computer system comprising the steps of:

generating an object file containing a symbol table;

scanning the object file to generate a module including a data section containing a plurality of data units, each data unit being one of a minimum addressable data unit and a longer data unit, each longer data unit comprising a plurality of a minimum addressable data units;

scanning the symbol table to generate a swap section in the module, the swap section containing data identifying locations of longer data units within the data section;

generating a signal representing the module; and transmitting the module representative signal to the remote computer system via the transmission link.

15. The method of claim 14 in which the central computer system further includes a source of an audio signal and a source of a video signal, further comprising, after the step of generating a signal representing the module, the step of multiplexing the audio signal, the video signal and the module representative signal to form a composite AVI signal.

16. In a multimedia transmission system including a central computer system generating a signal representing a module which includes a data section comprising a plurality of data units, each data unit being one of a minimum addressable data unit and a longer data unit, each longer data unit comprising a plurality of minimum addressable data units, and a swap section comprising data identifying locations of longer data units within the data section; a remote computer system; and a transmission link coupled between the central computer system and the remote computer system, for transmitting the module representative signal from the central computer system to the remote computer system, a method for operating the remote computer system comprising the steps of:

receiving the module representative signal;

extracting the data section from the module representative signal;

extracting the swap section from the module representative signal;

traversing the data in the swap section; and for each location in the data section identified as containing one of the longer data units, swapping the minimum addressable data units of the one of the longer data units by reversing the order of the minimum addressable data units in the longer data unit.

17. The method of claim 16, in which the signal generated by the central computer system is an audio/video/interactive (AVI) composite signal containing as a component the module representative signal and containing further components representing a video signal and an audio signal, wherein the receiving step comprises the steps of:

receiving the AVI composite signal;

separating the audio signal component, the video signal component, and the module representative signal component from the composite signal; and supplying the audio signal component and video signal component to a utilization means.

* * * * *